Figures 1, 2:
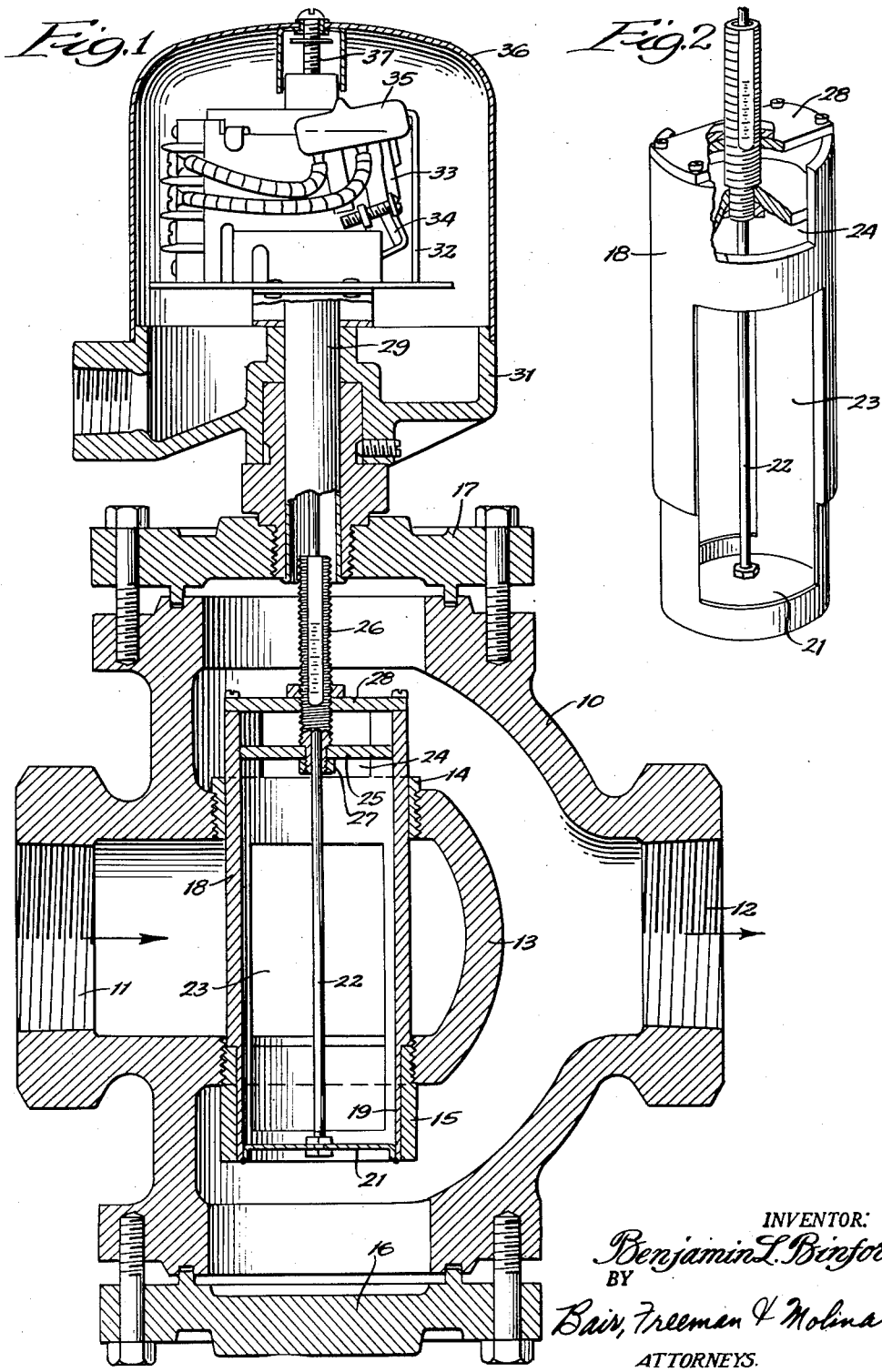

INVENTOR:
Benjamin L. Binford,
BY
Bair, Freeman & Molinare
ATTORNEYS.

United States Patent Office 2,776,567
Patented Jan. 8, 1957

2,776,567

FLOW RESPONSIVE DEVICE

Benjamin L. Binford, Chicago, Ill.

Application February 16, 1953, Serial No. 337,088

5 Claims. (Cl. 73—208)

This invention relates to a flow responsive device for producing an indication or effecting a control operation in response to fluid flow in excess of a predetermined amount.

Flow responsive devices as heretofore devised have not been entirely satisfactory for high flows which result in high differential pressures. Further, the adjustment of such devices for different flow rates has been difficult to effect with a high degree of accuracy.

It is one of the objects of the present invention to provide a flow responsive device which is simple in construction and extremely reliable and accurate in operation.

Another object is to provide a flow responsive device which is extremely rugged, but at the same time presents a relatively small area subjected to differential pressure due to flow and which therefore will respond accurately to high flow rates.

According to one feature of the invention the flow measuring element comprises a tube of different diameters at its opposite end portions to provide a relatively small differential area on which the differential pressure acts and which is formed with fluid metering passages through which the fluid flows.

A further object is to provide a flow responsive device in which the flow rate can be adjusted easily and accurately through a very simple mechanism.

The above and other objects and features of the invention will be more readily apparent from the following description when read in connection with the accompanying drawing in which Figure 1 is a sectional view through a flow responsive device embodying the invention, and Figure 2 is a perspective view with parts broken away of the differential tube.

The device as shown comprises a hollow body 10 formed with inlet and outlet ports 11 and 12 for connection to flow conduits. The body is provided with an internal hollow partition 13 having openings therein threaded to receive sleeves 14 and 15 of slightly different internal diameters. One end of the body is closed by a closure plate 16 and the opposite end carries a supporting plate 17 for indicating or controlling mechanism. It will be seen that the body is substantially identical to a standard valve body which may conveniently be employed.

The sleeves 14 and 15 are adapted to receive and to support for axial sliding movement a tube 18. The tube 18 as shown is of uniform external diameter throughout most of its length to fit slidably in the sleeve 14 and is reduced in diameter at its lower end as indicated at 19 to fit slidably in the sleeve 15. The major portion of the tube 18 is joined to the reduced lower end 19 through arcuate shouders, as shown. The lower end of the tube is closed by a cover 21 rigidly secured in the tube and which may carry an operating rod 22 for the indicating or controlling mechanism as shown.

The lower portion of the tube is formed with a pair of enlarged openings 23 in its side wall through which fluid can flow into or out of the tube, to or from the port 11. The opening 23 provides a substantially unrestricted passage for fluid. Near its upper end the tube is formed in its side walls with passages 24 which constitute flow metering passages. The effective size of the passages 24 can be controlled by an adjusting plate 25 slidably mounted in the tube and which fits relatively closely against the inner tube wall. The plate 25 is carried by a tubular threaded sleeve 26 which is rotatably secured to the plate by a nut 27. The sleeve 26 projects through and has threaded engagement with a top cover plate 28 secured to the upper end of the tube. By turning the sleeve 26 the plate 25 may be adjusted vertically in the tube to vary the effective size of the passages 24. Preferably the sleeve 26 is flattened on its opopsite sides as shown to be engaged by a wrench and may be calibrated for different flow rates as illustrated.

The rod 22 extends slidably through the sleeve 26 and into a tube 29 of non-magnetic meterial such as brass carried by the plate 17. The tube 29 carries a magnetic switching mechanism operated by a magnetic armature carried by the upper end of the rod 22. This mechanism as shown corresponds to that more particularly disclosed and claimed in my Patent No. 2,612,572, although it will be understood that any desired type of indicating or controlling mechanism responsive to movement of the rod 22 could be employed.

As shown, the plate 17 carries a base 31 in which the tube 29 is supported. A frame 32 of non-magnetic material is mounted on the tube 29 by a clamp as shown in my Patent 2,612,572 and carries a pivoted arm 33 having a permanent magnet 34 at its lower end. A tiltable switch 35 is carried by the arm 33 and may contain two or more sets of contacts to be closed as the switch is tilted in one direction or the other. A cover 36 encloses the switch mechanism and is attached to the base 31 by a screw 37 threaded into the upper end of the tube 29.

When there is no flow through the body, the parts will occupy the position shown in Figure 1 with the tube 18 in its lowermost position. At this time the lower edges of the passages 24 are flush with the top of the sleeve 14 and the armature carried by the rod 22 is in its lowermost position beneath the level of the magnet 34 so that the magnet will swing away from the tube 29 either in response to gravity or to suitable springs not shown. As flow through the body between the ports 11 and 12 increases, the pressure at the inlet port 11 will become higher than the pressure at the outlet port 12. The higher pressure will act upward on the area of the annular shoulder joining the upper and lower ends of the tube 18. The lower pressure will act downward on the entire upper end of the tube and upward on the reduced lower end of the tube, leaving a net downward force due to the low pressure only acting on the area of the annular shoulder joining the upper and lower ends of the tube. The net effect is an upward force equal to the differential pressure, i. e., the difference between the higher and lower pressures, times the area of the annular shoulder joining the upper and lower ends of the tube.

When the pressure differential due to flow exceeds the value for which the device is adjusted the tube 18 will rise and will raise the armature carried by the rod 22 up to the level of the magnet 34 to attract the magnet. At this time the arm 33 will be rocked clockwise to close or open conacts in the switch 35 thereby to effect either an indicating or a controlling operation. Since the flow area of passages 24 remains constant the tube 18 will continue to rise in response to the same rate of flow until the upper portion of the passages 23 is exposed above the top of the sleeve 14. Thus a positive movement of the tube through a distance at least equal to the space between passages 23 and 24 is insured to insure operation of the switch mechanism. It will be understood that one or more switches 35 could be employed to effect different indicating or controlling operations.

Because of the fact that only the differential area at opposite ends of the tube 18 is effective to shift the tube, the parts can be made very rugged and still will present a small effective area to the differential pressure. Furthermore, the desired flow rate can easily be set simply by turning the threaded sleeve 26 without in any way changing any other parts.

While one embodiment of the invention has been shown and described in detail, it will be apparent that this is illustrative only and is not to be taken as a definition of the scope of the invention, reference being had for this purpose to the appended claims.

What is claimed is:

1. A flow responsive device comprising a hollow casing formed with inlet and outlet ports, a hollow partition in the casing separating the ports and formed with aligned openings of different diameters, the interior and exterior of the partition communicating with the ports respectively, a tube having cylindrical end portions of different diameters fitting slidably in the openings respectively and forming an arcuate shoulder intermediate said openings, the tube being closed at its ends and having openings in its side wall to connect the ports through one of the aligned openings and being movable in response to differential pressure acting on the different diameter end portions thereof.

2. A flow responsive device comprising a hollow casing formed with inlet and outlet ports, a hollow partition in the casing separating the ports and formed with aligned openings of different diameters, the interior and exterior of the partition communicating with the ports respectively, a tube having cylindrical end portions of different diameters fitting slidably in the openings respectively and forming an arcuate shoulder intermediate said openings, the tube being closed at its ends and having a substantially unrestricted passage in its side wall communicating with one of the ports and a relatively restricted passage in its side wall communicating with the other of the ports, the tube being movable in response to differential pressure due to flow through the restricted passage acting on the different diameter end portions.

3. A flow responsive device comprising a hollow casing formed with inlet and outlet ports, a hollow partition in the casing separating the ports and formed with aligned openings of different diameters, the interior and exterior of the partition communicating with the ports respectively, a tube having cylindrical end portions of different diameters fitting slidably in the openings respectively and forming an arcuate shoulder intermediate said openings, the tube being closed at its ends and having a substantially unrestricted passage in its side wall between the aligned openings and a second passage in its side wall adjacent to one end extending beyond the adjacent aligned opening through which fluid can flow from one port to the other, the tube being movable in response to differential pressure due to flow through the passages acting on the different diameter end portions of the tube.

4. A flow responsive device comprising a hollow casing formed with inlet and outlet ports, a hollow partition in the casing separating the ports and formed with aligned openings of different diameters, the interior and exterior of the partition communicating with the ports respectively, a tube having cylindrical end portions of different diameters fitting slidably in the openings respectively and forming an arcuate shoulder intermediate said openings, the tube being closed at its ends and having a substantially unrestricted passage in its side wall between the aligned openings and a second passage in its side wall adjacent to one end extending beyond the adjacent aligned opening through which fluid can flow from one port to the other, the tube being movable in response to differential pressure due to flow through the passages acting on the different diameter end portions of the tube, a disc fitting slidably in the tube adjacent to said one end, means to adjust the disc axially of the tube to adjust the effective size of the second passage.

5. A flow responsive device comprising a hollow casing formed with inlet and outlet ports, a hollow partition in the casing separating the ports and formed with aligned openings of different diameters, the interior and exterior of the partition communicating with the ports respectively, a tube having cylindrical end portions of different diameters fitting slidably in the openings respectively and forming an arcuate shoulder intermediate said openings, the tube being closed at its ends and having a substantially unrestricted passage in its side wall between the aligned openings and a second passage in its side wall adjacent to one end extending beyond the adjacent aligned opening through which fluid can flow from one port to the other, the tube being movable in response to differential pressure due to flow through the passages acting on the different diameter end portions of the tube, a disc fitting slidably in the tube adjacent to said one end, a rod threaded through said one end of the tube to adjust the disc axially thereby to adjust the effective size of the second passage.

References Cited in the file of this patent

UNITED STATES PATENTS 2,052,022     Fisher _____ Aug. 25, 1936